United States Patent [19]

Post

[11] Patent Number: 5,121,239

[45] Date of Patent: Jun. 9, 1992

[54] FILTER HAVING ADJUSTABLE SPECTRAL TRANSMITTANCE FUNCTION

[75] Inventor: David L. Post, Kettering, Ohio

[73] Assignee: The United States of America as represented by the Secretary of the Air Force, Washington, D.C.

[21] Appl. No.: 424,479

[22] Filed: Oct. 20, 1989

[51] Int. Cl.$^5$ .......................... G02B 5/18; G02F 1/13; G02F 1/167

[52] U.S. Cl. ...................................... 359/95; 359/272; 359/573; 359/615

[58] Field of Search ........... 350/348, 391, 402, 162.18, 350/162.24, 168, 404, 347 V, 347 R, 347 E

[56] References Cited

U.S. PATENT DOCUMENTS

| | | | |
|---|---|---|---|
| 2,002,515 | 5/1935 | Worrall | 350/404 |
| 3,383,460 | 5/1968 | Pritchard . | |
| 3,501,219 | 3/1970 | Caulfield | 350/347 E |
| 3,710,015 | 1/1973 | Fowler | 350/168 |
| 3,729,252 | 4/1973 | Nelson . | |
| 4,110,014 | 8/1978 | Yevick | 350/347 R |
| 4,626,897 | 12/1986 | Sato et al. | 350/404 |
| 4,687,329 | 8/1987 | Schultz . | |
| 4,957,349 | 9/1990 | Clerc et al. | 350/347 E |

Primary Examiner—Bruce Y. Arnold
Assistant Examiner—Martin Lerner
Attorney, Agent, or Firm—Bobby D. Scearce; Donald J. Singer

[57] ABSTRACT

An optical filter having a variable spectral transmittance function of selectable shape is described which includes a spectrum forming element for dispersing a light beam into a characteristic spectrum, an optical system for forming an image of the spectrum and directing the image into a multi-element electronic spatial light modulator, such as a liquid crystal display or electrophoretic display, and an optical system for projecting the spectrally filtered light as a directed beam.

3 Claims, 3 Drawing Sheets

FILTER HAVING ADJUSTABLE SPECTRAL TRANSMITTANCE FUNCTION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical filters, and more particularly to an optical filter having variable spectral transmittance function of selectable shape.

In the calibration and use of certain optical instruments, such as a photometer, colorimeter, spectroradiometer or spectrophotometer, a specific spectral transmittance function (STF) is required. For example, the spectral sensitivity of a photopic photometer must closely match the CIE 1924 photopic luminosity function, which requires passing incoming light through a filter having an STF tailored to the spectral sensitivity of the photodetector of the photometer, the STF of the optical path, and the CIE luminosity function. Simple single-layer absorption filters can be used for this purpose but often yield poor accuracy because of deviations from the ideal STF at various wavelengths.

Accuracy can be improved by combining filters so that the composite filter more closely matches the ideal STF, but selection of the correct set of filters for a given photodetector and optical path STF is laborious; in a layered filter, photometer sensitivity suffers because light is lost in each layer; for a mosaic filter, the correct filter material and size for each piece of mosaic must be determined; aging or contamination may cause changes in spectral sensitivity of the photodetector or in the STF of the optical path or the filter; and component replacement in the photodetector or associated optical system may require a new filter to match unique spectral characteristics of the component.

A fixed-template filter defining a spectrum forming element and a spatial aperture with shape required to produce a desired STF can yield both high accuracy and sensitivity, but construction is an iterative, time consuming process which results in a device not easily adjustable to changes in spectral sensitivity.

In fixed-template filter colorimeters, each of three templates must be positioned in turn with respect to the spectrum forming element so that the corresponding tristimulus value can be measured, which means that the three tristimulus values cannot be measured simultaneously and a highly accurate positioning mechanism must be provided. Beamsplitters may be used to illuminate the three filters simultaneously, but this reduces sensitivity and yields a bulky device.

In certain spectroradiometers and spectrophotometers an STF is required to measure the spectral distribution of light, and is typically achieved using either a grating monochromator or prism monochromator to disperse light into a spectrum, portions of which are selected by a mechanically movable slit the measurements from which may be subject to positioning errors because of mechanical imperfections.

Finally, special STFs can be desired when designing light sources for light-modulating displays. Often the spectral selection characteristics of these displays are less than ideal because materials are not available which have both the desired spatial and spectral light modulating characteristics, particularly for color displays.

The present invention substantially solves or reduces in critical importance problems with existing systems by providing a general purpose light filter having an STF which can be altered rapidly and easily under computer control and can assume substantially any shape, but having no moving mechanical parts. Practical uses involve the visible wavelengths, however, the potential spectral range is theoretically much broader.

The invention has substantial utility for systems which do not require passing an image containing spatial modulation but which do require passing light (which need not be spatially homogeneous) through an STF which is not readily obtained with ordinary optical filter. These systems may include photometers, colorimeters and devices using monochromators, such as spectroradiometers and spectrophotometers, and light sources for light modulating monochrome or color displays for which an ideal illuminating spectral radiance distribution is difficult to achieve.

It is therefore a principal object of the invention to provide an improved optical filter.

It is a further object of the invention to provide an optical filter having variable spectral transmittance function.

These and other objects of the invention will become apparent as the detailed description of representative embodiments proceeds.

SUMMARY OF THE INVENTION

In accordance with the foregoing principles and objects of the invention, an optical filter having a variable spectral transmittance function of selectable shape is described which includes a spectrum forming element for dispersing a light beam into a characteristic spectrum, an optical system for forming an image of the spectrum and directing the image into a multi-element electronic spatial light modulator, such as a liquid crystal display or electrophoretic display, and an optical system for projecting the spectrally filtered light as a directed beam.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
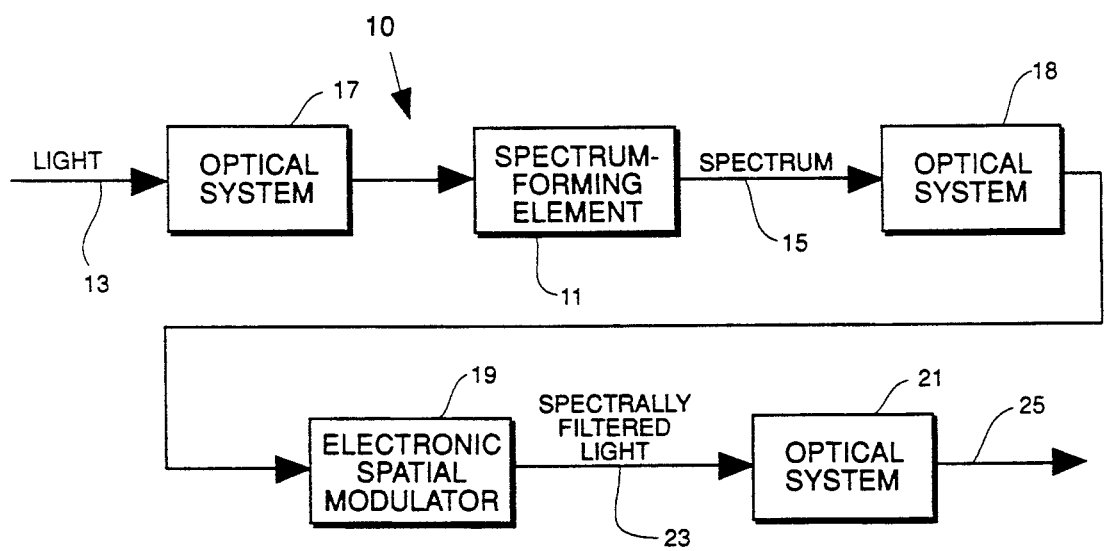
FIG. 1 is a diagram of an optical filter system having variable spectral transmittance function according to the invention.

Referring now to the drawings, FIG. 1 shows is a schematic diagram of an optical filter system 10 having variable STF according to the invention. System 10 includes spectrum forming element 11 which may be in the form of a prism, diffraction grating or other element of similar function providing means for dispersing incoming light beam 13 into characteristic spectrum 15. Optical system 17 comprising any suitable type and number of mirrors, lenses and the like may be provided to direct beam 13 into element 11. A second optical system 18 may be provided to form an image of spectrum 15 and direct the image to multi-element electronic spatial light modulator 19 (such as a liquid crystal display or electrophoretic display) where portions of spectrum 15 are attenuated by varying transmittance or reflectance of the various individual elements of modulator 19.

Figure 2:
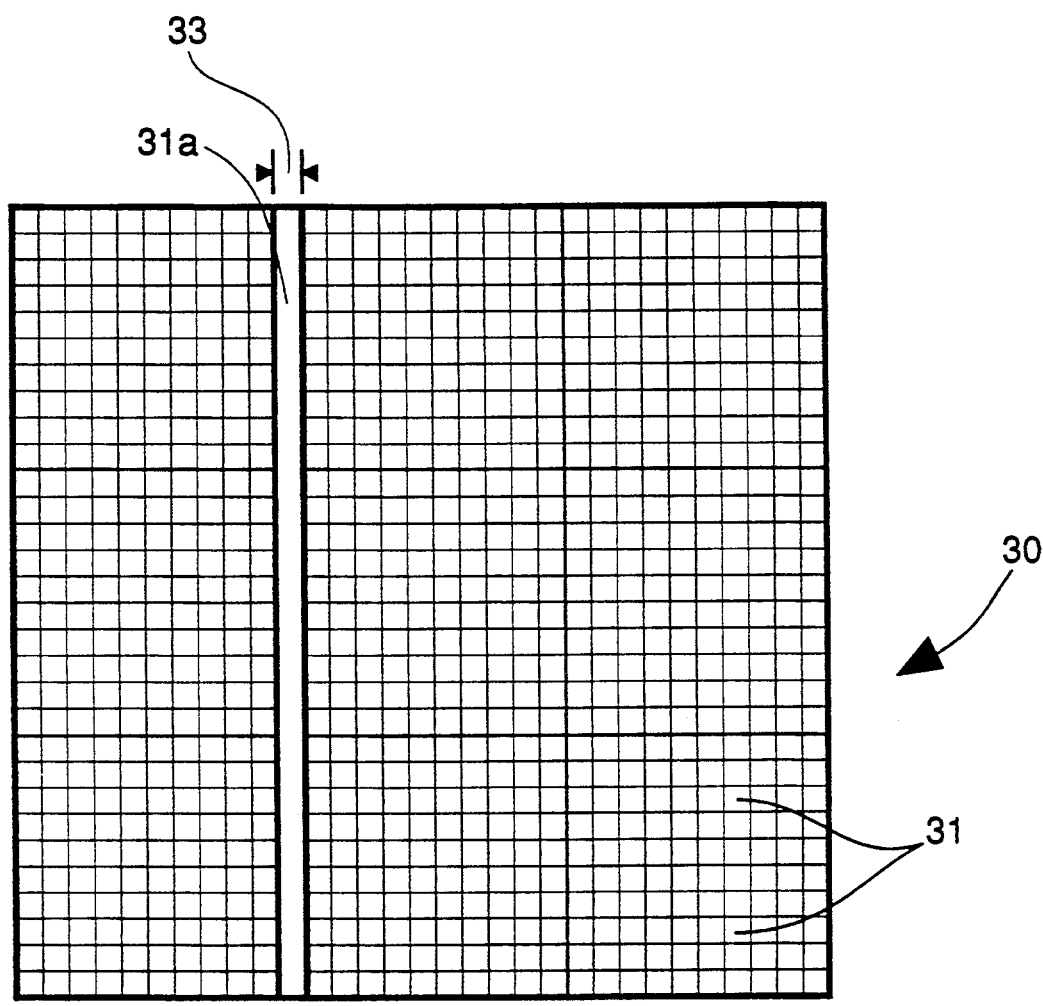
FIG. 2 is schematic plan view of a multi-element electronic spatial light modulator useful in the invention.
Figure 3:
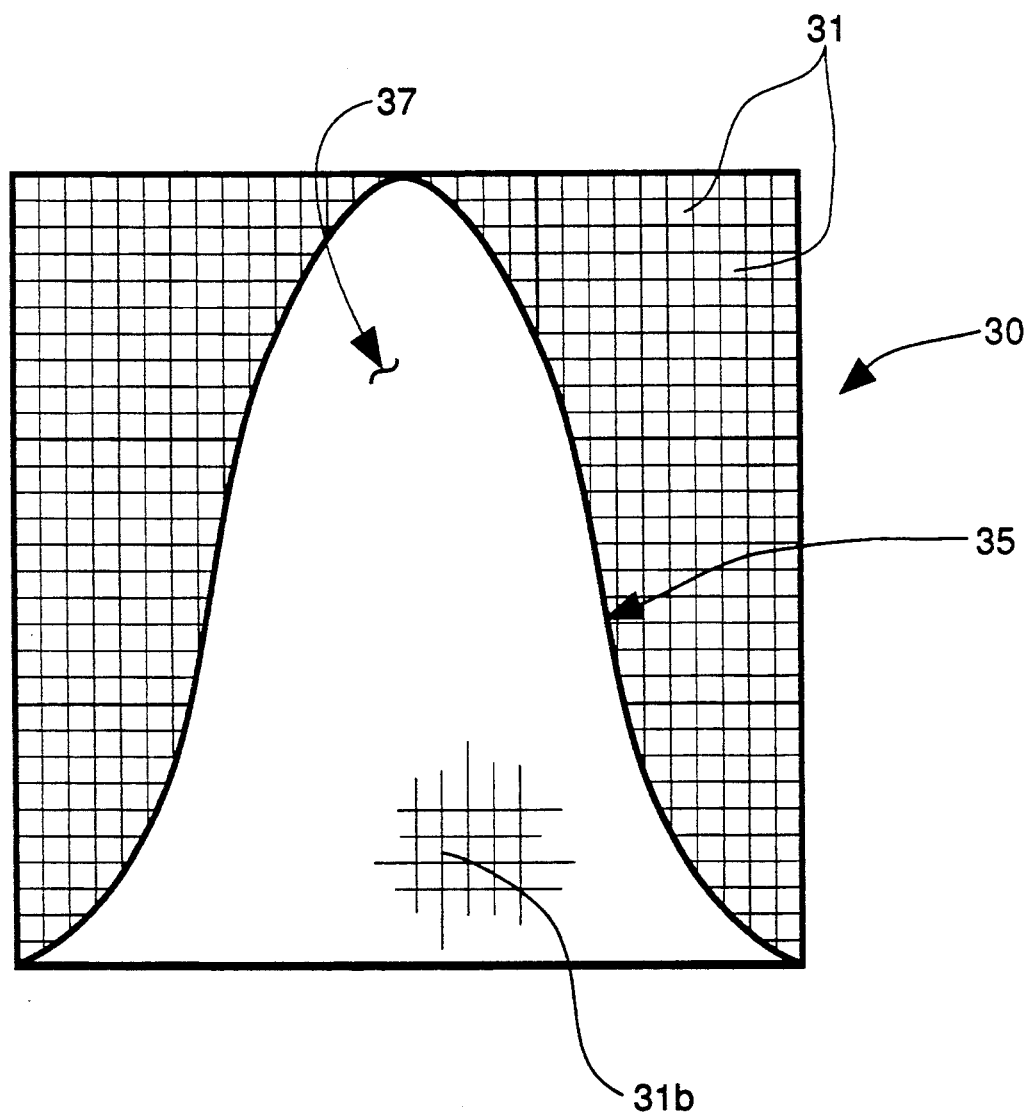
FIG. 3 is an illustration of a luminosity function displayed by the modulator of FIG. 2.

Modulator 19 may comprise substantially any multi-element electronic spatial light modulator as would occur to one skilled in the field of the invention guided by these teachings, such as that illustrated schematically in FIG. 2 comprising a rectangular array 30 of a plurality of pixels 31. In the operation of the embodiment of modulator 19 illustrated in FIG. 2, the desired function may be displayed on array 30 by turning on selected pixels at locations where it is desired that a selected portion of light of spectrum 15 be transmitted or reflected and turning off all other pixels of array 30. For example, if a STF in the form of a slit for a spectroradiometer is desired, FIG. 2 illustrates that the desired slit-shaped STF may be defined by turning on pixels 31a in a single column defining the selected waveband 33 of spectrum 15 to be transmitted (or reflected), and turning off all other pixels 31 of array 30. FIG. 3 illustrates another example of an STF which may be obtained by turning on selected pixels 31 of array 30. In the example of FIG. 3, pixels 31b are turned on under curve 35 to define a selected function 37, such as to display the CIE 1924 photopic luminosity function, and all other pixels 31 outside and above curve 35 are turned off.

Referring again to FIG. 1, a third optical system 21 may be provided to project the spectrally filtered light 23 transmitted (or reflected) by modulator 19 as suggested above as directed beam 25. Optical system 21 may typically include optical elements for recombining filtered light 23. Thus, system 10 may operate in principle primarily to a fixed template filter, but includes an electronic display to perform the spatial modulation function.

Any particular embodiment of system 10 constructed according to the teachings of the invention will be limited to a spectral range dictated by spectrum forming element 11 and by the spectral transmittance or reflectance of modulator 19. The accuracy of attainable STFs will be limited by the spatial and gray scale resolution and light leakage in the off state for modulator 19.

In assembling system 10 according to the invention, alignment between element 11 and modulator 19 is critical. Alignment of system 10 may be performed by directing beams of monochromatic light from each end of the spectral range with corresponding ends of modulator 19 on. Alignment adjustments are made to maximize modulator 19 output, at which maxima precise alignment of element 11 and modulator 19 is established. Alignment may be checked by successively stepping beam 13 through adjacent wavebands (as by computer control) and searching modulator 19 for locations where each signal is strongest. This waveband calibration can be saved and used later to assure that the proper wavebands are addressed.

If the output of system 10 is less than 100% in the fully on state for the wavelengths of interest, some STFs will not be obtainable. Further, a desired STF may be obtained by calibrating system 10 spectrally using a beam 13 with known spectral radiances distribution, selecting specific wavelength bands, measuring output radiance for each band, dividing output radiance by input radiance for each wavelength band and saving the results. Thereafter, each desired STF is divided by the spectral calibration on a waveband-by-waveband basis, yielding an STF corrected in accordance with the inherent STF of system 10. If all output requirements for the corrected STF are within the capabilities of system 10, it is displayed at modulator 19, thereby producing the desired STF. Otherwise, the desired STF cannot be obtained. However, in this case the corrected STF can be normalized and then displayed at modulator 19, thereby yielding an STF that is equivalent to the desired STF plus a neutral density filter, i.e., one having less than the desired overall transmittance but the correct spectral balance.

If the elements of modulator 19 have more than two (on/off) states, and their gray scale is calibrated, additional accuracy in the STF can be achieved by varying transmittance or reflectance of certain elements between the fully on and fully off states. For example, an element lying at the boundary between fully on and fully off states for a given waveband can be set to an intermediate level of transmittance or reflectance, which will cause it to function as a fractional element, thereby enhancing the effective spatial resolution and accuracy of the modulator. If the relationship between the gray scale command signal and the transmittance or reflectance of the modulator is nonlinear, this concept can be extended. In this case, two or more elements can be set to intermediate levels, yielding the equivalent of a single fractional element having many more gray scale steps than any single modulator element provides. The element(s) used for this purpose need not lie at the boundary between fully on and fully off states. Any N elements within each waveband can be assigned the fractional element role and, therefore, gray scale calibration need be performed only for these N elements.

STF accuracy can be enhanced by calibrating all prospective combinations of on and off states for modulator 19 elements within each waveband. Because on and off elements need never be intermingled, the maximum number of prospective combinations per waveband is equal to the number of elements per waveband plus one. This allows computation of an STF which takes into consideration spatial nonuniformities in the optical properties of the modulator.

When using the invention in a photometer, colorimeter, spectroradiometer or spectrophotometer, correction for light leakage in the fully off state of modulator 19 may be obtained by pointing the invention toward the light source to be measured, turning modulator 19 completely off, measuring output of the photodetector, obtaining a correction factor by multiplying the measurement by the proportion of off elements in the function about to be displayed (e.g., a photopic filter), displaying the function and measuring again, and subtracting the correction factor from the new measurement.

The invention therefore provides an optical filter providing a complex STF having any desired shape and which can be changed rapidly and easily, which capability characterizes no other available spectral filtering device and can form the basis for quickly and automatically calibrating highly accurate and sensitive photometers and colorimeters. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An optical filter structure having variable spectral transmittance function of selectable shape, comprising:
   (a) spectrum forming means for dispersing a light beam into its characteristic spectrum;
   (b) an electronic spatial light modulator;
   (c) optical means for forming a first image of said spectrum and projecting said first image onto said modulator;
   (d) said modulator including a two dimensional array of a plurality of binary elements each controllably switchable only between on and off states corresponding to states of transmittance and reflectance whereby a corresponding portion of said first image projected on each respective element of said plurality of elements may be attenuated by controllably switching each respective element between states of transmittance and reflectance and whereby a second image projected by said modulator has a spectral transmittance function of preselected shape characteristic of a preselected scheme of control of said controllable on and off states of all of said plurality of elements in said array;
   (e) optical means for projecting said second image as a directed light beam.

2. The structure of claim 1 wherein said electronic spatial light modulator includes one of a liquid crystal display and electrophoretic display.

3. The structure of claim 1 wherein said spectrum forming means includes one of a prism and a diffraction grating.

* * * * *

UNITED STATES PATENT AND TRADEMARK OFFICE
CERTIFICATE OF CORRECTION

PATENT NO. : 5,121,239
DATED : June 9, 1992
INVENTOR(S) : David L. Post It is certified that error appears in the above-identified patent and that said Letters Patent is hereby corrected as shown below:

```
Column 2, line 16, ""filter"  should read --filters--.
Column 3, line 38, "primarily" should read --similarly--.
Column 3, line 66, "radiances" should read --radiance--.
Column 6, line 8, --and-- should follow "array".
```

Signed and Sealed this

Seventeenth Day of August, 1993

Attest:

BRUCE LEHMAN

Attesting Officer

Commissioner of Patents and Trademarks